United States Patent [19]
Cognigni et al.

[11] Patent Number: 5,953,964
[45] Date of Patent: Sep. 21, 1999

[54] MULTISTAGE ANGULAR REDUCER

[75] Inventors: Enzo Cognigni; Pietro Depietri, both of Bologna, Italy

[73] Assignee: Bonfiglioli Riduttori S.P.A., Calderara Di Reno, Italy

[21] Appl. No.: 08/812,500

[22] Filed: Mar. 7, 1997

[30] Foreign Application Priority Data

Mar. 8, 1996 [IT] Italy ................. BO96A0124

[51] Int. Cl.⁶ .............. F16H 57/02; F16H 1/20; F16H 37/04
[52] U.S. Cl. .............. 74/606 R; 74/420; 74/325
[58] Field of Search ............... 74/420, 606 R, 74/325

[56] References Cited

U.S. PATENT DOCUMENTS

| | | | |
|---|---|---|---|
| 2,235,485 | 3/1941 | Jones, Jr. .................. | 74/421 A |
| 2,566,253 | 8/1951 | Schmitter .................... | 74/325 |
| 2,596,794 | 5/1952 | Schmitter .................... | 74/421 A |
| 2,869,384 | 1/1959 | Schmitter . | |
| 2,888,831 | 6/1959 | Malcom ................... | 74/606 R X |
| 3,029,661 | 4/1962 | Schmitter .................. | 74/606 R |
| 3,214,989 | 11/1965 | Wellauer et al. .......... | 74/606 R X |
| 3,796,108 | 3/1974 | Kime et al. . | |
| 3,798,991 | 3/1974 | Kime et al. . | |
| 5,058,456 | 10/1991 | Manrique et al. . | |
| 5,203,231 | 4/1993 | Minegishi et al. .......... | 74/606 R |
| 5,634,374 | 6/1997 | Depietri ..................... | 74/420 |

FOREIGN PATENT DOCUMENTS

| | | |
|---|---|---|
| 617214A1 | 9/1994 | European Pat. Off. . |
| 632213A1 | 1/1995 | European Pat. Off. . |
| 2400793 | 3/1979 | France . |
| 2362505 | 6/1974 | Germany . |
| 1442839 | 7/1976 | United Kingdom . |
| 9410482 | 5/1994 | WIPO . |

*Primary Examiner*—John A. Jeffery
*Assistant Examiner*—William C Joyce
*Attorney, Agent, or Firm*—Birch, Stewart, Kolasch &Birch,LLP.

[57] ABSTRACT

An angular reducer with two or three reduction stages, wherein the casing is designed to selectively house two or three reduction stages, while maintaining unchanged, when switching from two to three stages or vice versa, the mutual positions of the axis of the drive shaft and the axis of the driven shaft; and wherein the casing has a number of inner supports for supporting the two alternative gear trains.

11 Claims, 3 Drawing Sheets

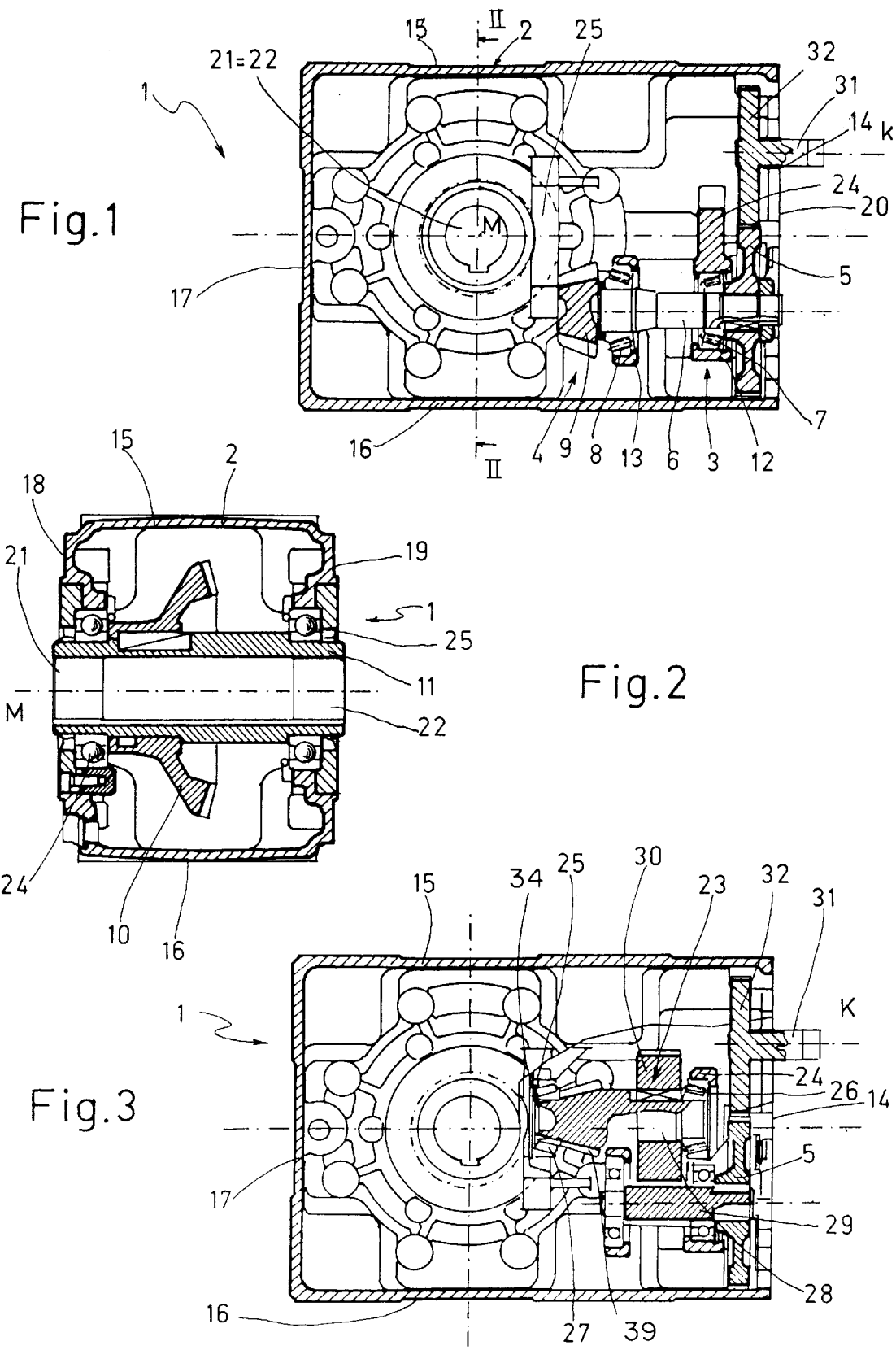

MULTISTAGE ANGULAR REDUCER

BACKGROUND OF THE INVENTION

The present invention relates to a multistage angular reducer.

As is known, reducers of the above type comprise a casing, an input drive shaft, an output driven shaft, and a number of reduction stages housed inside the casing and interposed between the drive and driven shafts.

The main drawback of currently marketed reducers lies in the casing being designed to house either two or three reduction stages, with no possibility of varying the number of stages in the casing by means of straightforward operations (e.g. switch from two to three stages or vice versa). That is, it is not possible to switch from a two-stage to a three-stage design using the same casing, which lacks the seats for supporting the mechanisms required for converting the gear train from one design to the other. The first stage of currently marketed motor reducers is nearly always defined by a bevel pinion meshing with a bevel ring gear, which means the stage producing the most vibration is located at the start of the gear train, thus increasing the noise level of the system as a whole.

SUMMARY OF THE INVENTION

It is an object of the present invention to provide a multistage angular reducer designed to overcome the aforementioned drawbacks.

According to the present invention, there is provided a multistage angular reducer of the type comprising:

a casing;

a drive shaft;

a driven shaft connected to a user element; and a number of reduction stages housed inside the casing, between the drive shaft and the driven shaft;

wherein the casing is designed to selectively house two or three reduction stages, while maintaining unchanged, when switching from two to three stages or vice versa, the mutual positions of the axis of the drive shaft and the axis of the driven shaft; and wherein the casing comprises a number of inner supports for supporting the two alternative gear trains comprising a number of shafts and toothed elements.

Moreover, the stage comprising the bevel pinion is never located at the start of the gear train.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A number of preferred, non-limiting embodiments of the present invention will be described by way of example with reference to the accompanying drawings, in which (elements performing the same or similar functions are indicated using the same numbering system):

FIG. 1 shows a preferred embodiment of a two-stage angular reducer in accordance with the present invention;

FIG. 2 shows a cross section of the preferred embodiment in FIG. 1;

FIG. 3 shows a preferred embodiment of a three-stage angular reducer in accordance with the present invention and featuring the same casing as the FIGS. 1 and 2 reducer;

DETAILED DESCRIPTION OF THE INVENTION

Figure 4:
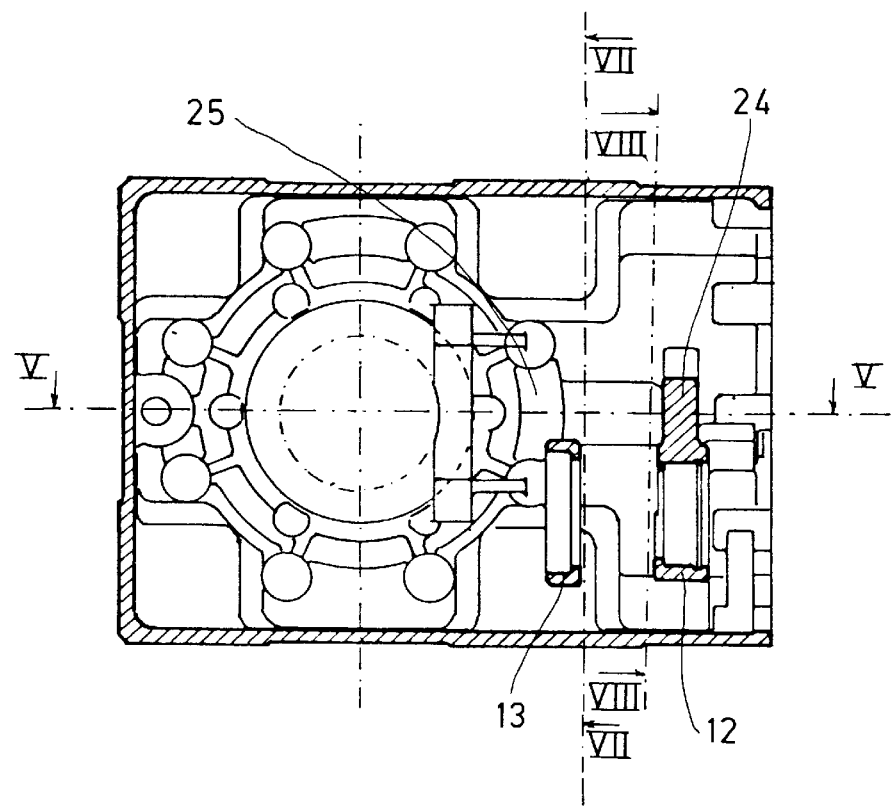
FIG. 4 shows a section of the casing of the reducer in FIGS. 1 to 3.

In the FIGS. 1 and 2 embodiment, the angular reducer 1 comprises two reduction stages 3, 4 housed inside a casing 2. The first stage 3 comprises a first cylindrical gear 32 (of axis K) integral with a drive shaft 31, and which meshes with a second cylindrical gear 5 fitted to a shaft 6 supported by two bearings 7, 8.

The second stage 4 in the FIGS. 1 and 2 embodiment comprises a hypoid bevel pinion 9 meshing with a bevel ring gear 10 integral with a driven shaft 11 (of axis M) (FIG. 2).

As shown in FIGS. 1 and 2, the hypoid pinion 9 is supported by the same shaft 6 to which the second cylindrical gear 5 is fitted, and which, as stated, is in turn supported by the bearings 7, 8, which are supported by inner supports 12, 13.

The Casing 2 comprises a number of walls 14–19 defining a box structure; wall 14 comprises an opening 20 through which motion is transmitted from the first cylindrical gear 32 to the second cylindrical gear 5; and seats 21, 22 (FIG. 2) are formed respectively in walls 18, 19 to support the driven shaft 11 by means of bearings 24, 25, and therefore also support the bevel ring gear 10 integral with the driven shaft 11.

In the FIGS. 1 and 2 embodiment featuring two stages 3, 4, shaft the 6 to which second cylindrical gear 5 is fitted also supports the hypoid pinion 9, which, as stated, meshes with the bevel ring gear 10 to transmit motion from the shaft 6 to driven shaft 11. As shown in FIG. 1, the inner supports 12, 13, and therefore also the respective bearings 7, 8, are located in the gap between the second cylindrical gear 5 and the hypoid bevel pinion 9.

In the two-stage reducer, motion "enters" the casing 2 via the first reduction stage 3 defined by the first cylindrical gear 32 meshing with the second cylindrical gear 5, "passes" through the second reduction stage 4 defined by the hypoid pinion 9 meshing with the bevel ring gear 10, and "leaves" from the driven shaft 11 which drives a user element (not shown).

To switch to a three-stage reducer 1 using the same casing 2 and maintaining the the same distance between axes K and M, a third stage 23 must be added. That is, a second pair of inner supports 24, 25 supporting a countershaft 28 by means of respective bearings 26, 27 must be provided. In the three-stage embodiment shown in FIG. 3, the shaft 6 of the FIG. 1 two-stage reducer is replaced by a toothed shaft 29 meshing with a third cylindrical gear 30 fitted to the countershaft 28, which also supports a bevel pinion 39. The third cylindrical gear 30 and the bevel pinion 39 are housed inside the gap defined by the inner supports 24 and 25, which, for the elements of the three-stage gear train to mesh properly, are offset with respect to the inner supports 12 and 13.

In a preferred embodiment of the invention, the four inner supports 12, 13, 24, 25 may be formed in one piece with the casing 2.

The inner supports 24, 25 are also obviously provided in the FIG. 1 embodiment featuring only the two reduction stages 3, 4, in which case, only inner supports 12 and 13 are used for supporting the transmission elements.

The third reduction stage 23 is located between the first stage 3 and the second stage 34, which is "shifted" so to speak to permit insertion of the third reduction stage 23. Though specific reference is made in the FIG. 3 embodiment to a toothed shaft 29, this may obviously be replaced by any equivalent transmission member (e.g. a cylindrical gear integral with a shaft resting on inner supports 12, 13).

As shown in the accompanying drawings, the axis of the inner supports 24, 25 is coplanar and perpendicular to axis M of the seats 21, 22, so as to define a plane not containing axis K of drive shaft 31.

Figure 5:
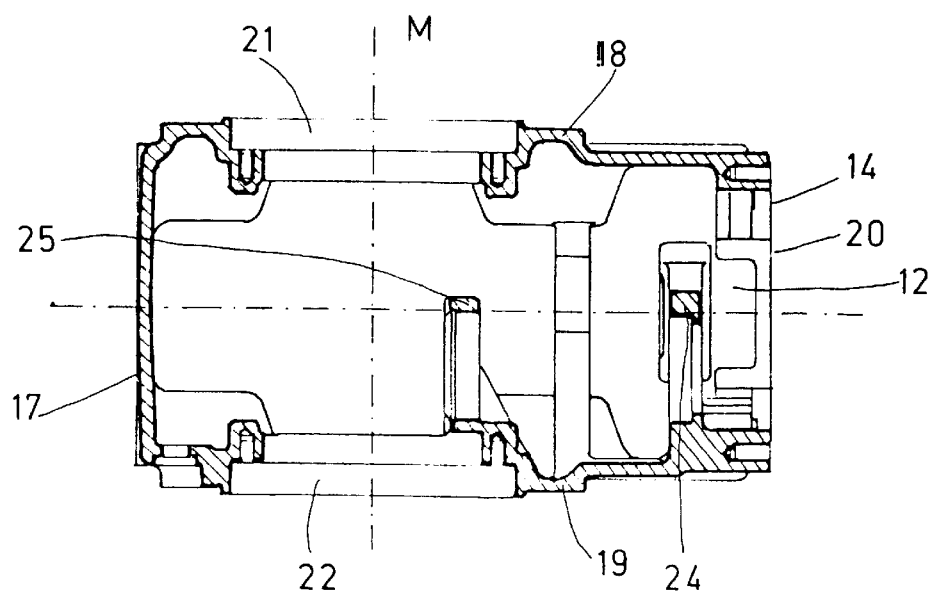
FIG. 5 shows a first section of the FIG. 4. casing.
Figure 6:
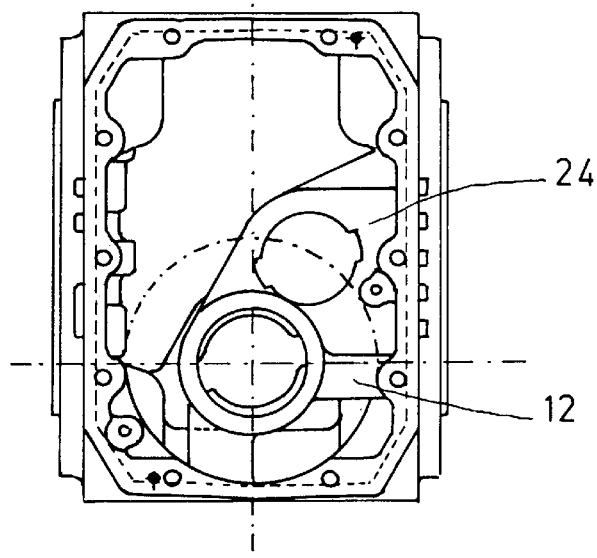
FIG. 6 shows a side view of the casing in the above drawings.
Figure 7:
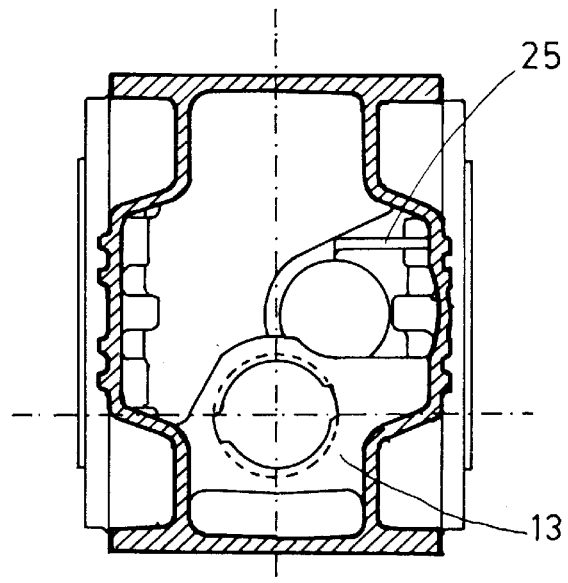
FIG. 7 shows a second section of the FIG. 4 casing.
Figure 8:
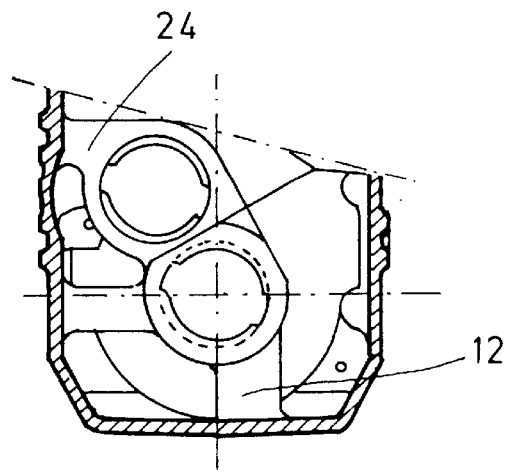
FIG. 8 shows a third section of the FIG. 4 casing.

FIGS. 4–8 show more clearly the mutual positions of the inner supports 12, 13, 24, 25, also with respect to the walls 14–19 defining the casing 2.

The reducer described therefore provides for considerable saving in terms of production and storage cost, by enabling the same casing to be used for two or three stages, as required by the user. Moreover, substitution of the gear train is a highly straightforward job not requiring the use of particularly skilled labour.

Clearly, changes may be made to the angular reducer as described and illustrated herein without, however, departing from the scope of the present invention.

We claim:

1. A multistage speed reducer comprising:
    a casing, said casing having a first pair of inner supports formed integrally in one piece with said casing, and a second pair of inner supports formed integrally in one piece with said casing;
    a drive shaft rotatable about a first axis;
    a driven shaft rotatable about a second axis; and
    a plurality of reductions stages housed inside of said casing between said drive shaft and said driven shaft, at least one of said stages including a ring gear mounted on said driven shaft;
    said multistage speed reducer being selectively reconfigurable between a two reduction stage configuration and a three reduction stage configuration, with the mutual positions of the first axis of the drive shaft and the second axis of the driven shaft remaining unchanged in each of said configurations,
    wherein when said multistage speed reducer is configured in said two reduction stage configuration, a pinion shaft which supports a pinion meshing with said ring gear is supported by said first pair of inner supports, and when said multistage speed reducer is configured in said three reduction stage configuration, a pinion shaft which support a pinion meshing with said ring gear is supported by said second pair of inner supports.

2. The multistage speed reducer according to claim 1, wherein said pinion is a bevel pinion when said multistage speed reducer is configured in said three reduction stage configuration.

3. The multistage speed reducer according to claim 1, wherein said pinion is a hypoid pinion when said multistage speed reducer is configured in said two reduction stage configuration.

4. The multistage speed reducer according to claim 1, wherein said pinion and ring gear comprise a second reduction stage of said plurality of reduction stages.

5. The multistage speed reducer according to claim 1, wherein a first reduction stage of said plurality of reduction stages comprises a pair of cylindrical gears.

6. The multistage speed reducer according to claim 1, wherein said first axis is perpendicular to said second axis.

7. The multistage speed reducer according to claim 1, wherein when said multistage speed reducer is configured in said three reduction stage configuration, the multistage speed reducer further comprises a countershaft supported by said first pair of inner supports.

8. The multistage speed reducer according to claim 1, wherein said second pair of inner supports are laterally offset with respect to said first pair of inner supports.

9. The multistage speed reducer according to claim 1, wherein when said multistage speed reducer is configured in said two reduction stage configuration, said first pair of inner supports are located inside a gap between a cylindrical gear and said pinion.

10. The multistage speed reducer according to claim 1, wherein when said multistage speed reducer is configured in said three reduction stage configuration, a cylindrical gear and said pinion are located in a gap between said pair of second inner supports.

11. A multistage speed reducer comprising:
    a casing, said casing having a first pair of inner supports formed integrally in one piece with said casing, and a second pair of inner supports formed integrally in one piece with said casing, said second pair of inner supports being laterally offset with respect to said first pair of inner supports;
    a drive shaft rotatable about a first axis;
    a driven shaft rotatable about a second axis perpendicular to said first axis; and
    a plurality of reductions stages housed inside of said casing between said drive shaft and said driven shaft, a first reduction stage of said plurality of reduction stages comprising a pair of cylindrical gears, at least one other of said stages including a ring gear mounted on said driven shaft;
    said multistage speed reducer being selectively reconfigurable between a two reduction stage configuration and a three reduction stage configuration, with the mutual positions of the first axis of the drive shaft and the second axis of the driven shaft remaining unchanged in each of said configurations,
    wherein when said multistage speed reducer is configured in said two reduction stage configuration, said pinion is a hypoid pinion, a pinion shaft which supports said hypoid pinion meshing with said ring gear is supported by said first pair of inner supports, and said first pair of inner supports are located inside a gap between one of said cylindrical gears and said pinion, and when said multistage speed reducer is configured in said three reduction stage configuration, said pinion is a bevel pinion, a pinion shaft which supports said bevel pinion meshing with said ring gear is supported by said second pair of inner supports, one of said cylindrical gears and said pinion are located in a gap between said pair of second inner supports, and the multistage speed reducer further comprises a countershaft supported by said first pair of inner supports.

\* \* \* \* \*